US012067939B2

(12) United States Patent
Hu

(10) Patent No.: US 12,067,939 B2
(45) Date of Patent: Aug. 20, 2024

(54) PIXEL CIRCUIT, METHOD FOR CONTROLLING A PIXEL CIRCUIT, AND ARRAY SUBSTRATE

(71) Applicant: TCL China Star Optoelectronics Technology Co., Ltd., Guangdong (CN)

(72) Inventor: Meng Hu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/637,559

(22) PCT Filed: Dec. 30, 2021

(86) PCT No.: PCT/CN2021/143154

§ 371 (c)(1),
(2) Date: Feb. 23, 2022

(87) PCT Pub. No.: WO2023/123226

PCT Pub. Date: Jul. 6, 2023

(65) Prior Publication Data

US 2024/0046866 A1 Feb. 8, 2024

(30) Foreign Application Priority Data

Dec. 28, 2021 (CN) ......................... 202111621452.8

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0223* (2013.01); *G09G 2320/045* (2013.01)

(58) Field of Classification Search
CPC ......... G09G 3/3233; G09G 2300/0819; G09G 2300/0842; G09G 2310/08; G09G 2320/0223; G09G 2320/045; G09G 2300/0861; G09G 2310/0251; G09G 2310/0262
See application file for complete search history.

(56) References Cited

U.S. PATENT DOCUMENTS

2010/0164847 A1 7/2010 Lee
2012/0293479 A1 11/2012 Han
(Continued)

FOREIGN PATENT DOCUMENTS

CN 103236236 A 8/2013
CN 105243986 A 1/2016
CN 107749278 A 3/2018
(Continued)

*Primary Examiner* — Abhishek Sarma
(74) *Attorney, Agent, or Firm* — Nathan & Associates; Menachem Nathan

(57) ABSTRACT

A pixel circuit, a method for controlling a pixel circuit, an array substrate, and a display panel are provided. Based on the structural improvement of the pixel circuit, when the light-emitting control signal is maintained at a high level, turning on a driving transistor by changing a Vgate signal from a high level to a low level, to complete a reset initialization of the driving transistor; and compensating a turn-on voltage of the driving transistor by changing a Vdata signal from a low level to a high level.

18 Claims, 3 Drawing Sheets

(56) References Cited

U.S. PATENT DOCUMENTS

| | | | | |
|---|---|---|---|---|
| 2015/0379929 | A1 | 12/2015 | Zhai | |
| 2019/0130830 | A1* | 5/2019 | Han | G09G 3/3241 |

FOREIGN PATENT DOCUMENTS

| | | | |
|---|---|---|---|
| CN | 207302590 | U | 5/2018 |
| CN | 108492774 | A | 9/2018 |
| CN | 108877679 | A | 11/2018 |
| CN | 110364117 | A | 10/2019 |
| CN | 111613180 | A | 9/2020 |
| CN | 113745254 | A | 12/2021 |

* cited by examiner

PIXEL CIRCUIT, METHOD FOR CONTROLLING A PIXEL CIRCUIT, AND ARRAY SUBSTRATE

FIELD OF INVENTION

The present disclosure relates to the field of organic light emitting display, and more particularly, to a pixel circuit, a method for controlling a pixel circuit, and an array substrate.

BACKGROUND OF INVENTION

Organic light emitting diode (OLED) displays have the advantages of high brightness, wide viewing angle, fast response speed, low power consumption, etc. They have been widely used in the field of high-performance display. Active-matrix Organic Light Emitting Diode (AMOLED) displays use Low Temperature Poly-silicon (LTPS) technology, which has a higher mobility, but the thin-film transistors (TFT) therein have a problem of threshold voltage drifting. Therefore, the OLED pixel circuit needs a corresponding compensation structure. Currently, the structure of an OLED pixel compensation circuit is relatively complex, which occupies a large area in the design layout, which is disadvantageous to the design of high Pixels Per Inch (PPI) displays.

In panel manufacturing of OLED and other product types, in order to improve the yield and quality of products, the voltage of some electric potential points of the basic driving circuit is often compensated to obtain a certain effect of maintaining the voltage difference between the electric potential points. Therefore, the transistor is kept with a fixed working characteristic, and thereby achieve an objective of keeping the control variable unchanged, and the driving current Id can be controlled only by the Vdata to further control the brightness of the light emitting diode.

Technical Problems

The traditional OLED driving technology uses data signals to control the gate-source voltage difference Vgs of the driving transistor Td and to change the ON-resistance of the driving transistor Td, such that the current passing through the light emitting diode is different and thereby different brightness can be obtained. However, this technology requires that the manufacturing process characteristics of the driving TFT of each pixel should be exactly the same in the process of manufacturing the transistors, in order to ensure that the Vth of the driving transistors Td is exactly the same. In this way, the uniformity of the display of the pixel can be ensured, however such technical requirement is too idealistic and would be too difficult to achieve precisely.

SUMMARY OF INVENTION

Technical Solutions

In one aspect, an embodiment of the present application provides a pixel circuit, including:

a driving transistor;

a compensation unit connected to a gate of the driving transistor and a source of the driving transistor, respectively, and configured to receive a Vgate signal and a Vdata signal;

a reset unit connected to the compensation unit and configured to receive the Vgate signal;

a light-emitting control unit connected to a drain of the driving transistor and the source of the driving transistor, respectively, and configured to receive a VDD voltage and a light-emitting control signal, respectively, and further configured to output a light-emitting driving signal;

wherein the reset unit and the compensation unit compensate a turn-on voltage of the driving transistor according to the Vgate signal and the Vdata signal such that a voltage difference between the VDD voltage and the Vdata signal is related to the light-emitting driving signal.

In one aspect, an embodiment of the present application provides a method for controlling a pixel circuit, including steps of:

when the light-emitting control signal is maintained at a high level, turning on a driving transistor by changing a Vgate signal from a high level to a low level, to complete a reset initialization of the driving transistor;

compensating a turn-on voltage of the driving transistor by changing a Vdata signal from a low level to a high level; and outputting a light-emitting driving signal by changing the light-emitting control signal from a high level to a low level and changing the Vgate signal from a low level to a high level.

In one aspect, an embodiment of the present application provides an array substrate, including: a pixel circuit, the pixel circuit including:

a driving transistor;

a compensation unit connected to a gate of the driving transistor and a source of the driving transistor, respectively, and configured to receive a Vgate signal and a Vdata signal;

a reset unit connected to the compensation unit and configured to receive the Vgate signal; and a light-emitting control unit connected to a drain of the driving transistor and the source of the driving transistor, respectively, and configured to receive a VDD voltage and a light-emitting control signal, respectively, and further configured to output a light-emitting driving signal;

wherein the reset unit and the compensation unit compensate a turn-on voltage of the driving transistor according to the Vgate signal and the Vdata signal, such that a voltage difference between the VDD voltage and the Vdata signal is related to the light-emitting driving signal.

In one aspect, the embodiment of the present application provides a display panel, including an array substrate, the array substrate including a pixel circuit, the pixel circuit including:

a driving transistor;

a compensation unit connected to a gate of the driving transistor and a source of the driving transistor, respectively, and configured to receive a Vgate signal and a Vdata signal;

a reset unit connected to the compensation unit and configured to receive the Vgate signal; and a light-emitting control unit connected to a drain of the driving transistor and the source of the driving transistor, respectively, and configured to receive a VDD voltage and a light-emitting control signal, respectively, and further configured to output a light-emitting driving signal;

wherein the reset unit and the compensation unit compensate a turn-on voltage of the driving transistor according to the Vgate signal and the Vdata signal, such that a voltage difference between the VDD voltage and the Vdata signal is related to the light-emitting driving signal.

Beneficial Effect

The above-mentioned pixel circuit compensates a turn-on voltage of the driving transistor according to the Vgate signal and the Vdata signal through the connection between the driving transistor, the compensation unit, the reset unit and the light-emitting control unit, such that a voltage difference between the VDD voltage and the Vdata signal is related to the light-emitting driving signal. Based on this, a stable Vgs can be maintained by compensating the turn-on voltage of the driving transistor, and a stable output environment for determining light-emitting driving signals based on voltage difference is achieved.

DESCRIPTION OF DRAWINGS

In order to describe the technical solutions more clearly in the embodiments of the present application, the following will briefly introduce the drawings needed in the description of the embodiments. Obviously, the drawings in the following description are only some embodiments of the present application. For those skilled in the art, without creative work, other drawings can be obtained based on these drawings.

DETAILED DESCRIPTION OF PREFERRED EMBODIMENTS

In order to facilitate understanding of the present application, the present application will be described more fully below with reference to the related drawings. Preferred embodiments of the present application are shown in the accompanying drawings. However, the application may be implemented in many different forms and is not limited to the embodiments described herein. Rather, these embodiments are provided so that this disclosure will be thorough and complete.

It should be noted that when an element is referred to as being "connected" to another element, it can be directly connected to and integrated with the other element, or intervening elements may also be present. The terms "installed," "one end," "the other end," and similar expressions used herein are for illustrative purposes only.

Unless otherwise defined, all technical and scientific terms used herein have the same meaning as commonly understood by one of ordinary skill in the technical field to which this application belongs. The terms used herein in the specification of the application are for the purpose of describing specific embodiments only and are not intended to limit the application. As used herein, the term "and/or" includes any and all combinations of one or more of the associated listed items.

An embodiment of the present application provides a pixel circuit.

Figure 1:
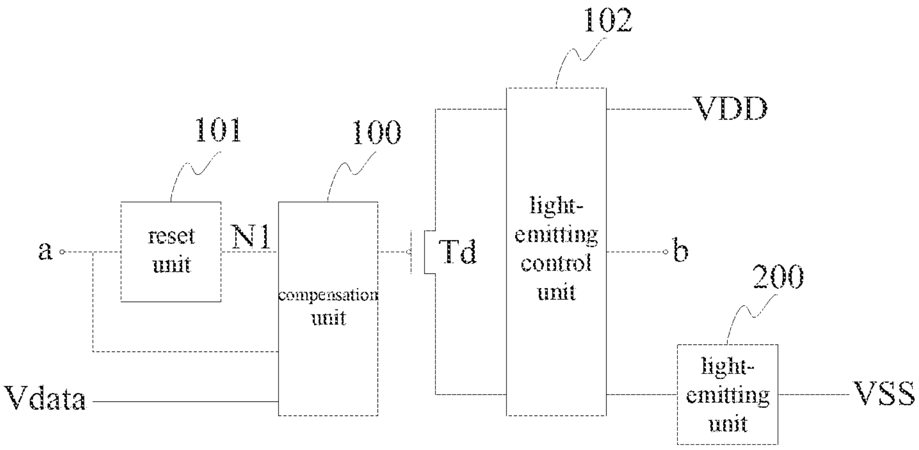
FIG. 1 is a structural diagram of a pixel circuit module according to an embodiment.

FIG. 1 is a structural diagram of a pixel circuit module according to an embodiment. As shown in FIG. 1, a pixel circuit of an embodiment includes:

a driving transistor Td;

a compensation unit 100 connected to a gate of the driving transistor Td and a source of the driving transistor Td, respectively, and configured to receive a Vgate signal and a Vdata signal;

a reset unit 101 connected to the compensation unit 100 and configured to receive the Vgate signal;

a light-emitting control unit 102 connected to a drain of the driving transistor Td and the source of the driving transistor Td, respectively, and configured to receive a VDD voltage and a light-emitting control signal (node b), respectively, and further configured to output a light-emitting driving signal;

wherein the reset unit 101 and the compensation unit 100 compensate a turn-on voltage of the driving transistor Td according to the Vgate signal and the Vdata signal such that a voltage difference between the VDD voltage and the Vdata signal is related to the light-emitting driving signal.

As shown in FIG. 1, a side of the reset unit 101 receives the Vgate signal (node a shown in FIG. 1), and the other side (node N1) is connected to the compensation unit 100. The compensation unit 100 receives the Vgate signal and the Vdata signal at the same time, and is connected to the gate of the driving transistor Td and the source of the driving transistor Td. The turn-on or turn-off of the driving transistor Td is used as one of the output switches of the light-emitting driving signal.

At the same time, the circuit design of the compensation unit 100 compensates the turn-on voltage of the driving transistor Td through voltage division or coupling design. As a preferred embodiment, the compensation unit 100 compensates the turn-on voltage of the driving transistor Td through the coupling effect of the elements in the reset unit 101.

The light-emitting control unit 102 is connected to the drain of the driving transistor Td and the source of the driving transistor Td, and acts as another switch outside the driving transistor Td to control whether the light-emitting driving signal is output or not. In which, the switch design of the light-emitting control unit 102 uses the light-emitting control signal as the switch signal to turn on or turn off. When the light-emitting control unit 102 and the driving transistor Td are both turned on, VDD outputs the light-emitting driving signal in the form of a current signal through the channel to drive the light-emitting device to work.

Figure 2:
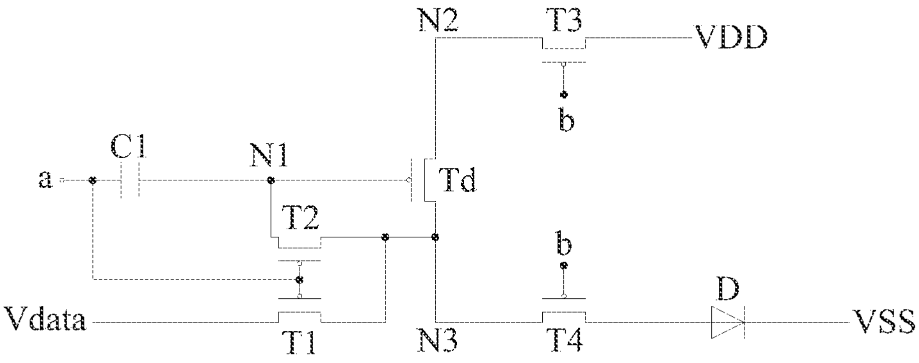
FIG. 2 is a circuit diagram of a pixel according to an embodiment.

In one embodiment, FIG. 2 is a circuit diagram of a pixel according to an embodiment. As shown in FIG. 2, the reset unit 101 includes:

a first capacitor C1, wherein an end of the first capacitor C1 receives the Vgate signal (node a), and another end of the first capacitor is connected to the compensation unit 100.

The Vgate signal is connected to the first electrode of the first capacitor C1 through a node a. When the Vgate signal is changed from a high level to a low level, the voltage variation range is ΔV. Because the first capacitor C1 is suspended, in order to keep the voltage drop across the first capacitor C1 unchanged, the voltage variation range of the node N1 is the same as the potential variation of the driving signal receiving terminal a, that is, the changed potential of the node N1 is at a low level. Based on this, a reset initialization of the driving transistor Td is completed, and the driving transistor Td changes from an off state to the a on state.

In one embodiment, as shown in FIG. 2, the compensation unit 100 includes:

a first transistor T1, wherein a source of the first transistor receives the Vdata signal, a drain of the first transistor is connected to the source of the driving transistor Td, and a gate of the first transistor receives the Vgate signal; and a second transistor T2, wherein a source of the second transistor is connected to the reset unit and the gate of the driving transistor Td, respectively, a drain of the second transistor is connected to the source of the driving transistor Td, and a gate of the second transistor receives the Vgate signal.

In one embodiment, as shown in FIG. 2, the light-emitting control unit 102 includes:

a third transistor T3, wherein a source of the third transistor receives the VDD voltage, a drain of the third transistor Td is connected to the drain of the driving transistor, and a gate of the third transistor receives the light-emitting control signal; and a fourth transistor, wherein a source of the fourth transistor is connected to the source of the driving transistor Td, a drain of the fourth transistor outputs the light-emitting driving signal, and a gate of the fourth transistor receives the light-emitting control signal.

In one embodiment, the first transistor T1, the second transistor T2, the third transistor T3 or the fourth transistor T4 is a P-type transistors. It should be noted that, on the premise of satisfying the working logic of the compensation unit 100 and the light-emitting control unit 102, the switching relationship can be determined through different types of transistors and connection relationships. This embodiment is a preferred manner, which is beneficial to saving the number of transistors, so as to reduce the volume and cost of the overall circuit.

As shown in FIG. 2, when the Vgate signal is at a low level, the light-emitting control signal EM (node "b") is at a high level. At this time, the first transistor T1 and the second transistor T2 are turned on, and the third transistor T3 and the fourth transistor T4 are turned off. The potential variation of the node N2 is the Vdata signal. The potential variation of the node N1 is Vdata+Vth, the driving transistor Td is changed from the on state to the off state. The data voltage Vdata signal compensates the turn-on voltage Vth of the driving transistor Td through the coupling effect of the first capacitor C1, and the turn-on voltage Vth is a positive value.

When the light-emitting control signal EM is at a low level, the Vgate signal is at a high level. At this time, the first transistor T1 and the second transistor T2 are turned off, and the third transistor T3 and the fourth transistor T4 are turned on. The potential of the node N2 becomes the VDD signal of the reference signal terminal, which is at a high level, and the driving transistor Td outputs a light-emitting driving signal.

In one embodiment, as shown in FIG. 1, the pixel circuit of an embodiment further includes:

a light-emitting unit 200 receiving the light-emitting driving signal.

The light-emitting unit 200 receives the light-emitting driving signal and emits light according to the light-emitting driving signal.

In one embodiment, the light-emitting unit 200 includes:

a light emitting diode D, wherein an anode of the light emitting diode receives the light-emitting driving signal, and a cathode of the light emitting diode receives a low level.

As shown in FIG. 2, the cathode of the light emitting diode D receives a low level VSS, and it is turned on when it receives the light-emitting driving signal.

The pixel circuits of the above-mentioned embodiments compensate a turn-on voltage of the driving transistor Td according to the Vgate signal and the Vdata signal through the connection between the driving transistor Td, the compensation unit 100, the reset unit 101 and the light-emitting control unit 102, such that a voltage difference between the VDD voltage and the Vdata signal is related to the light-emitting driving signal. Based on this, a stable Vgs can be maintained by compensating the turn-on voltage of the driving transistor Td, and a stable output environment for determining light-emitting driving signals based on voltage difference is achieved.

Based on this, an embodiment of the present application further provides a method for controlling a pixel circuit.

Figure 3:
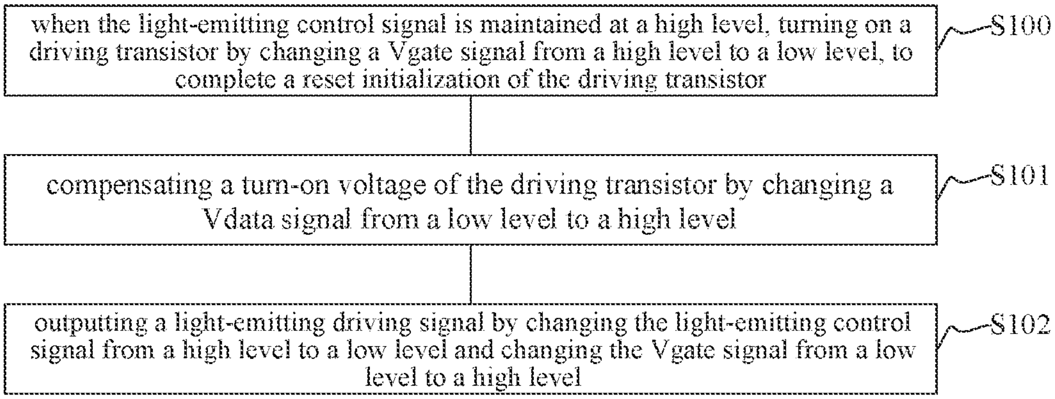
FIG. 3 is a flowchart of a method for controlling a pixel circuit according to an embodiment.

FIG. 3 is a flowchart of a method for controlling a pixel circuit according to an embodiment. As shown in FIG. 3, the method for controlling a pixel circuit of an embodiment includes steps S100 to S102:

S100, when the light-emitting control signal is maintained at a high level, turning on a driving transistor by changing a Vgate signal from a high level to a low level, to complete a reset initialization of the driving transistor;

S101, compensating a turn-on voltage of the driving transistor by changing a Vdata signal from a low level to a high level;

S102, outputting a light-emitting driving signal by changing the light-emitting control signal from a high level to a low level and changing the Vgate signal from a low level to a high level.

In one embodiment, the step of compensating a turn-on voltage of the driving transistor by changing a Vdata signal from a low level to a high level comprises steps of:

compensating the turn-on voltage through the Vdata signal by changing the Vdata signal from the low level to the high level, turning on a first transistor and a second transistor, and then turning off the first transistor and the second transistor.

In one embodiment, the step of outputting a light-emitting driving signal by changing the light-emitting control signal from a high level to a low level and changing the Vgate signal from a low level to a high level comprises steps of:

outputting the light-emitting driving signal by changing the light-emitting control signal from the high level to the low level, changing the Vgate signal from the low level to the high level, turning off the first transistor and the second transistor, and then turning on a third transistor and a fourth transistor.

Figure 4:
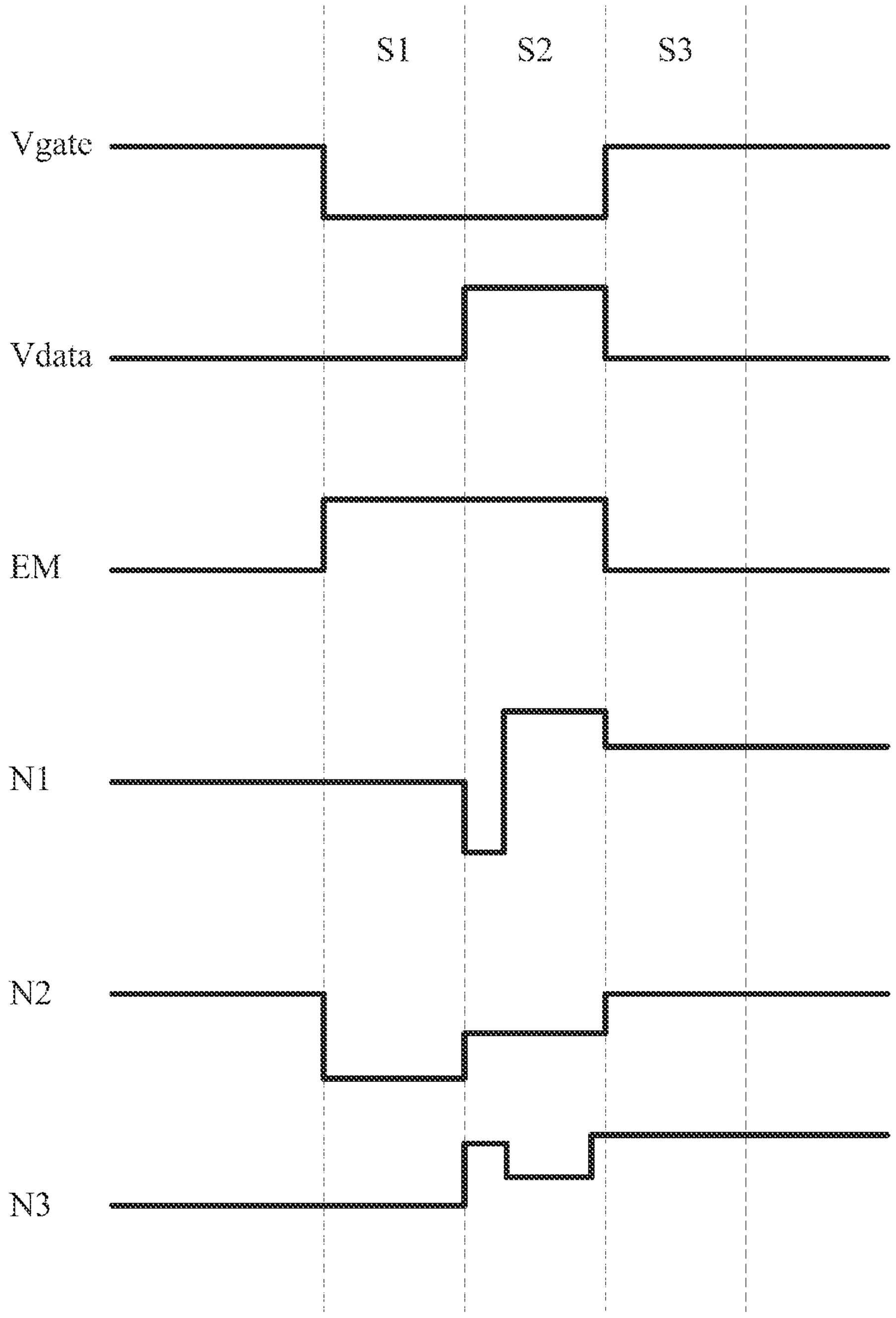
FIG. 4 is a timing chart of a control signal of a pixel circuit.

FIG. 4 is a timing chart of a control signal of a pixel circuit (the nodes corresponding the level may refer to FIG. 3), as shown in FIG. 4:

In a first stage S1, when the Vgate signal is changed from a high level to a low level, the voltage variation range is ΔV. Because the first capacitor is suspended, in order to keep the voltage drop across the first capacitor unchanged, the voltage variation range of the node N1 is the same as the potential variation of the driving signal receiving terminal a, that is, the changed potential of the node N1 is at a low level.

Based on this, a reset initialization of the driving transistor is completed, and the driving transistor changes from an off state to the a on state.

In a second stage S2, when the Vgate signal is at a low level, the light-emitting control signal EM (node "b") is at a high level. At this time, the first transistor and the second transistor are turned on, and the third transistor and the fourth transistor T4 are turned off. The potential variation of the node N2 is the Vdata signal. The potential variation of the node N1 is Vdata+Vth, the driving transistor is changed from the on state to the off state. The data voltage Vdata signal compensates the turn-on voltage Vth of the driving transistor through the coupling effect of the first capacitor, and the turn-on voltage Vth is a positive value.

In a third stage S3, when the light-emitting control signal EM is at a low level, the Vgate signal is at a high level. At this time, the first transistor and the second transistor are turned off, and the third transistor and the fourth transistor are turned on. The potential of the node N2 becomes the VDD signal of the reference signal terminal, which is at a high level, and the driving transistor outputs a light-emitting driving signal.

The above-mentioned method for controlling a pixel circuit, based on the structural improvement of the pixel circuit, when the light-emitting control signal is maintained at a high level, turning on a driving transistor by changing a Vgate signal from a high level to a low level, to complete a reset initialization of the driving transistor; and further compensating a turn-on voltage of the driving transistor by changing a Vdata signal from a low level to a high level; and outputting a light-emitting driving signal by changing the light-emitting control signal from a high level to a low level and changing the Vgate signal from a low level to a high level. Based on this, a stable Vgs can be maintained by compensating the turn-on voltage of the driving transistor, and a stable output environment for determining light-emitting driving signals based on voltage difference is achieved.

An embodiment of the present application further provides an array substrate.

The array substrate includes a pixel circuit arranged in an array, and a plurality of groups of data lines;

wherein each group of data lines correspondingly outputs Vgate signal, Vdata signal and light-emitting control signal EM.

The array substrate further includes a power line for providing a VDD voltage and a VSS ground terminal.

In one embodiment, the data lines are correspondingly connected to the data drivers, and the data drivers output corresponding driving signals.

The above-mentioned array substrate uses the structural improvement of the pixel circuit, a stable Vgs can be maintained by compensating the turn-on voltage of the driving transistor, and a stable output environment for determining light-emitting driving signals based on voltage difference is achieved.

An embodiment of the present application further provides an array substrate.

A display panel includes the above-mentioned array substrate.

Based on this, the display panel can be disposed in a display device that needs a display function, such as a mobile phone, a tablet computer, a TV, a monitor, a notebook computer, a digital photo frame, a media player, a watch device, a pendant device, an earphone or headphone device, a navigation device, an embedded devices for wearable or miniature electronic devices with displays installed in self-service kiosks or systems in cars.

The above-mentioned display panel uses the structural improvement of the pixel circuit, a stable Vgs can be maintained by compensating the turn-on voltage of the driving transistor, and a stable output environment for determining light-emitting driving signals based on voltage difference is achieved.

The technical features of the above embodiments can be combined arbitrarily. In order to simplify the description, all possible combinations of the technical features in the above embodiments are not described. However, as long as there is no contradiction in the combination of these technical features, they should be considered to be within the scope of the description in this specification.

The above examples only represent several embodiments of the present application, and the descriptions thereof are relatively specific and detailed, but should not be construed as a limitation on the scope of the patent application. It should be pointed out that for those skilled in the art, without departing from the concept of the present application, several modifications and improvements can be made, which all belong to the protection scope of the present application. Therefore, the scope of protection of the patent of the present application shall be subject to the appended claims.

What is claimed is:

1. A pixel circuit, comprising:

a driving transistor;

a compensation unit connected to a gate of the driving transistor and a source of the driving transistor, respectively, and configured to receive a Vgate signal and a Vdata signal;

a reset unit connected to the compensation unit and configured to receive the Vgate signal; and a light-emitting control unit connected to a drain of the driving transistor and the source of the driving transistor, respectively, and configured to receive a VDD voltage and a light-emitting control signal, respectively, and further configured to output a light-emitting driving signal;

wherein the reset unit and the compensation unit compensate a turn-on voltage of the driving transistor according to the Vgate signal and the Vdata signal such that a voltage difference between the VDD voltage and the Vdata signal is related to the light-emitting driving signal, wherein when the light-emitting control signal is maintained at a high level, a reset initialization of the driving transistor is completed by turning on the driving transistor by changing the Vgate signal from a high level to a low level;

the turn-on voltage of the driving transistor is compensated by changing the Vdata signal from a low level to a high level; and the light-emitting driving signal is outputted by changing the light-emitting control signal from a high level to a low level and changing the Vgate signal from a low level to a high level.

2. The pixel circuit according to claim 1, wherein the reset unit comprises:

a first capacitor, wherein an end of the first capacitor receives the Vgate signal, and another end of the first capacitor is connected to the compensation unit.

3. The pixel circuit according to claim 1, wherein the compensation unit comprises:

a first transistor, wherein a source of the first transistor receives the Vdata signal, a drain of the first transistor is connected to the source of the driving transistor, and a gate of the first transistor receives the Vgate signal; and a second transistor, wherein a source of the second transistor is connected to the reset unit and the gate of the driving transistor, respectively, a drain of the second transistor is connected to the source of the driving transistor, and a gate of the second transistor receives the Vgate signal.

4. The pixel circuit according to claim 3, wherein the first transistor or the second transistor is a P-type transistor.

5. The pixel circuit according to claim 3, wherein the light-emitting control unit comprises:

a third transistor, wherein a source of the third transistor receives the VDD voltage, a drain of the third transistor is connected to the drain of the driving transistor, and a gate of the third transistor receives the light-emitting control signal; and a fourth transistor, wherein a source of the fourth transistor is connected to the source of the driving transistor, a drain of the fourth transistor outputs the light-emitting driving signal, and a gate of the fourth transistor receives the light-emitting control signal.

6. The pixel circuit according to claim 5, wherein the first transistor, the second transistor, the third transistor or the fourth transistor is a P-type transistor.

7. The pixel circuit according to claim 1, further comprising:

a light-emitting unit receiving the light-emitting driving signal.

8. The pixel circuit according to claim 7, wherein the light-emitting unit comprises:

a light emitting diode, wherein an anode of the light emitting diode receives the light-emitting driving signal, and a cathode of the light emitting diode receives a low level.

9. A method for controlling a pixel circuit, comprising steps of:

when the light-emitting control signal is maintained at a high level, turning on a driving transistor by changing a Vgate signal from a high level to a low level, to complete a reset initialization of the driving transistor;

compensating a turn-on voltage of the driving transistor by changing a Vdata signal from a low level to a high level; and outputting a light-emitting driving signal by changing the light-emitting control signal from a high level to a low level and changing the Vgate signal from a low level to a high level, wherein the step of compensating a turn-on voltage of the driving transistor by changing a Vdata signal from a low level to a high level comprises steps of:

compensating the turn-on voltage through the Vdata signal by changing the Vdata signal from the low level to the high level, turning on a first transistor and a second transistor, and then turning off the first transistor and the second transistor.

10. The method for controlling a pixel circuit according to claim 9, wherein the step of outputting a light-emitting driving signal by changing the light-emitting control signal from a high level to a low level and changing the Vgate signal from a low level to a high level comprises steps of:

outputting the light-emitting driving signal by changing the light-emitting control signal from the high level to the low level, changing the Vgate signal from the low level to the high level, turning off the first transistor and the second transistor, and then turning on a third transistor and a fourth transistor.

11. An array substrate, comprising:

a pixel circuit, the pixel circuit including:

a driving transistor;

a compensation unit connected to a gate of the driving transistor and a source of the driving transistor, respectively, and configured to receive a Vgate signal and a Vdata signal;

a reset unit connected to the compensation unit and configured to receive the Vgate signal; and a light-emitting control unit connected to a drain of the driving transistor and the source of the driving transistor, respectively, and configured to receive a VDD voltage and a light-emitting control signal, respectively, and further configured to output a light-emitting driving signal;

wherein the reset unit and the compensation unit compensate a turn-on voltage of the driving transistor according to the Vgate signal and the Vdata signal, such that a voltage difference between the VDD voltage and the Vdata signal is related to the light-emitting driving signal, wherein when the light-emitting control signal is maintained at a high level, a reset initialization of the driving transistor is completed by turning on the driving transistor by changing the Vgate signal from a high level to a low level;

the turn-on voltage of the driving transistor is compensated by changing the Vdata signal from a low level to a high level; and the light-emitting driving signal is outputted by changing the light-emitting control signal from a high level to a low level and changing the Vgate signal from a low level to a high level.

12. The array substrate according to claim 11, wherein the reset unit comprises:

a first capacitor, wherein an end of the first capacitor receives the Vgate signal, and another end of the first capacitor is connected to the compensation unit.

13. The array substrate according to claim 11, wherein the compensation unit comprises:

a first transistor, wherein a source of the first transistor receives the Vdata signal, a drain of the first transistor is connected to the source of the driving transistor, and a gate of the first transistor receives the Vgate signal; and a second transistor, wherein a source of the second transistor is connected to the reset unit and the gate of the driving transistor respectively, a drain of the second transistor is connected to the source of the driving transistor, and a gate of the second transistor receives the Vgate signal.

14. The array substrate according to claim 13, wherein the first transistor or the second transistor, a third transistor or a fourth transistor is a P-type transistors transistor.

15. The array substrate according to claim 13, wherein the light-emitting control unit comprises:

a third transistor, wherein a source of the third transistor receives the VDD voltage, a drain of the third transistor is connected to the drain of the driving transistor, and a gate of the third transistor receives the light-emitting control signal; and a fourth transistor, wherein a source of the fourth transistor is connected to the source of the driving transistor, a drain of the fourth transistor outputs the light-emitting driving signal, and a gate of the fourth transistor receives the light-emitting control signal.

16. The array substrate according to claim 15, wherein the first transistor, the second transistor, the third transistor or the fourth transistor is a P-type transistors transistor.

17. The array substrate according to claim 11, further comprising:

a light-emitting unit receiving the light-emitting driving signal.

18. The array substrate according to claim 17, wherein the light-emitting unit comprises:

a light emitting diode, wherein an anode of the light emitting diode receives the light-emitting driving signal, and a cathode of the light emitting diode receives a low level.

* * * * *